United States Patent
Stewart et al.

(10) Patent No.: US 10,622,816 B2
(45) Date of Patent: Apr. 14, 2020

(54) BATTERY SYSTEM WITH SHIPPING MODE

(71) Applicant: K2 Energy Solutions, Inc., Henderson, NV (US)

(72) Inventors: Scott Stewart, Henderson, NV (US); Gilbert De Guzman, Henderson, NV (US); David Gurtner, Las Vegas, NV (US); Walter Bacharowski, Las Vegas, NV (US)

(73) Assignee: K2 Energy Solutions, Inc., Henderson, NV (US)

( * ) Notice: Subject to any disclaimer, the term of this patent is extended or adjusted under 35 U.S.C. 154(b) by 0 days.

(21) Appl. No.: 16/436,253

(22) Filed: Jun. 10, 2019

(65) Prior Publication Data

US 2019/0296563 A1  Sep. 26, 2019

Related U.S. Application Data

(63) Continuation-in-part of application No. 15/456,124, filed on Mar. 10, 2017, now Pat. No. 10,326,286.

(60) Provisional application No. 62/373,573, filed on Aug. 11, 2016.

(51) Int. Cl.
*H02J 7/00* (2006.01)
*H01M 10/42* (2006.01)

(52) U.S. Cl.
CPC ......... *H02J 7/0021* (2013.01); *H01M 10/425* (2013.01); *H01M 2010/4271* (2013.01)

(58) Field of Classification Search
CPC ............... H02J 7/0021; H01M 10/425; H01M 2010/4271
USPC .......................................................... 320/112
See application file for complete search history.

(56) References Cited

U.S. PATENT DOCUMENTS 6,072,250 A * 6/2000 Thandiwe .............. H02J 7/0011 307/150
8,450,975 B2 * 5/2013 Kim ..................... H01M 10/425 320/134
2017/0047617 A1 * 2/2017 Liao .................. H01M 10/4257

* cited by examiner

*Primary Examiner* — Nathaniel R Pelton
(74) *Attorney, Agent, or Firm* — Stine Law Ltd

(57) ABSTRACT

For a battery system including a battery pack and a battery management system, the battery system having output battery terminals, a method and apparatus for preventing inadvertent connection and disconnection the output battery terminals from the battery pack is disclosed.

16 Claims, 4 Drawing Sheets

Method of turning battery on or off using a button

Method of ensuring that turning the battery on or off does not occur from accidental contact with the button Method of ensuring that turning the battery on or off does not occur from accidental prolonged contact with the button

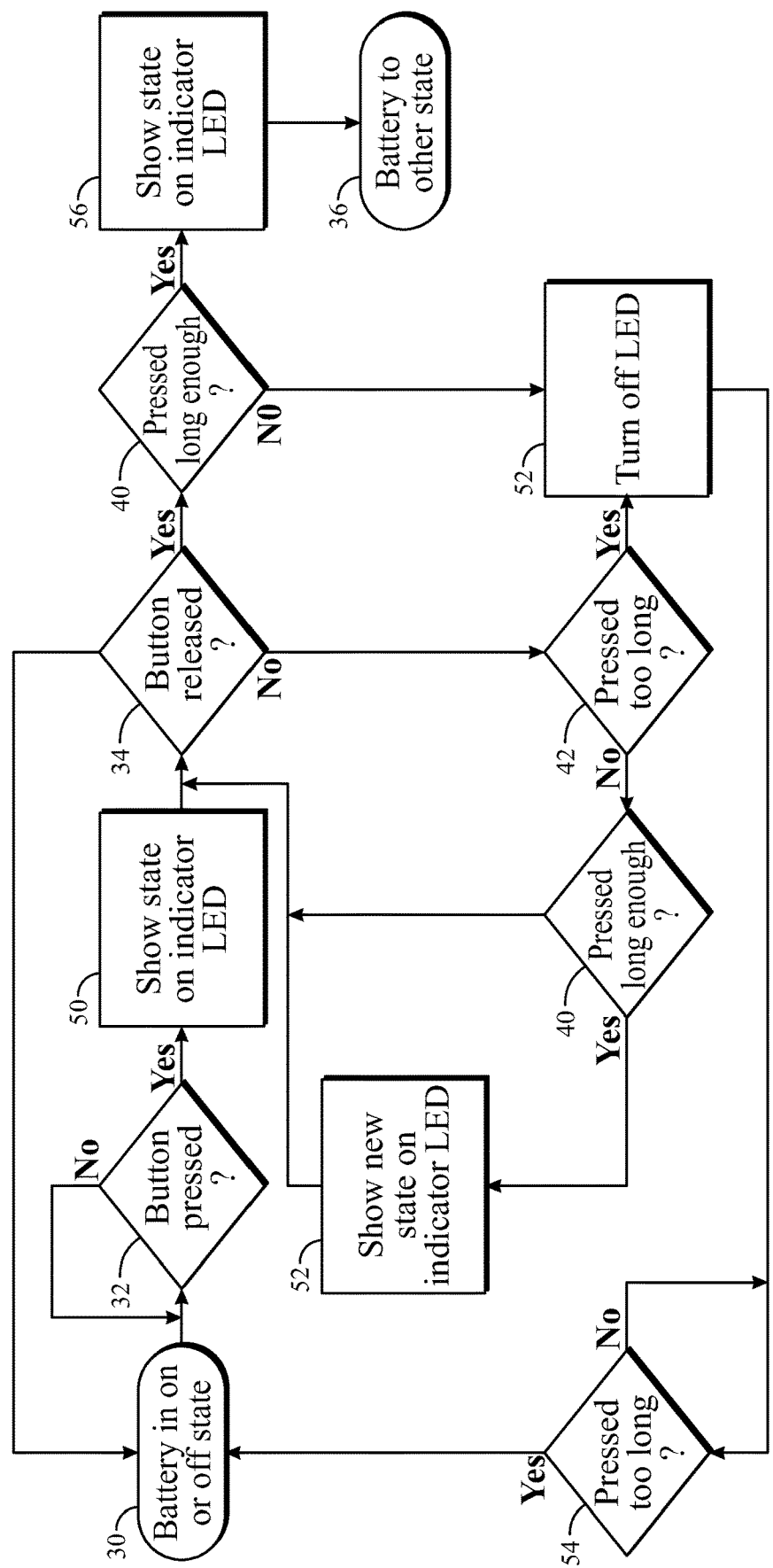
FIG. 6 Method of ensuring that turning the battery on or off does not occur from accidental prolonged contact with the button, with LED indication

BATTERY SYSTEM WITH SHIPPING MODE

FIELD OF THE INVENTION

The present invention relates to a battery, such as a battery pack comprising a plurality of lithium ion battery cells, and more particularly to a battery system comprising a battery management system coupled to the battery for placing the battery in a 'shipping mode' by disconnecting battery terminals of the battery pack, rendering any contact with the terminals benign.

BACKGROUND OF THE INVENTION

A battery system may include a battery pack coupled to a battery management system. The battery pack may include a plurality of battery cells, such as lithium ion battery cells, coupled in series and/or parallel to achieve desired parameters such as capacity and output voltage. It may be desirable to selectively change the state of the battery, alternating the state of the battery between an activated state and a deactivated state. For example it may be desirable to deactivate the battery, placing the battery in what may be referred to as a 'shipping mode,' wherein the battery is effectively turned off, disconnecting one or more battery terminals so that any external contact with the terminals, such as might occur during shipping of the battery, would be benign. Beyond actual shipping, this 'shipping mode' may also be useful to provide additional safety while installing, mounting, storing, or working in any way with the battery.

It may also be desirable to reactivate the battery, switching the battery out of the 'shipping mode,' wherein the battery is turned on, reconnecting the battery terminals.

According to one conventional battery design, the battery may include a user actuated input device which alternatively activates and deactivates the 'shipping mode' of the battery. See for example, FIG. 3, wherein an input device, such as a pushbutton switch, may be actuated, changing the state of the battery, initially in either an 'on' or an 'off' state, to that of the other state. However in certain circumstances, such as when shipping, or otherwise handling, the battery, the input device may be inadvertently actuated, thereby inadvertently alternating the state of the battery.

DESCRIPTION OF THE FIGURES

For a more complete understanding of the disclosure, reference should be made to the following detailed description and accompanying drawings, wherein:

FIGS. 4-6 are flowcharts illustrating methods of alternating between battery modes, in accordance with the battery system of FIG. 1.

DESCRIPTION OF THE PREFERRED EMBODIMENTS

While this invention is susceptible of embodiment in many different forms, there will be described herein in detail, specific embodiments thereof with the understanding that the present disclosure is to be considered exemplifications of the principles of the invention and is not intended to limit the invention to the specific embodiments illustrated.

As described below, a method and apparatus is provided for disconnecting and reconnecting a battery, such as a lithium ion battery, and for indicating the battery's connection state.

Figure 1:
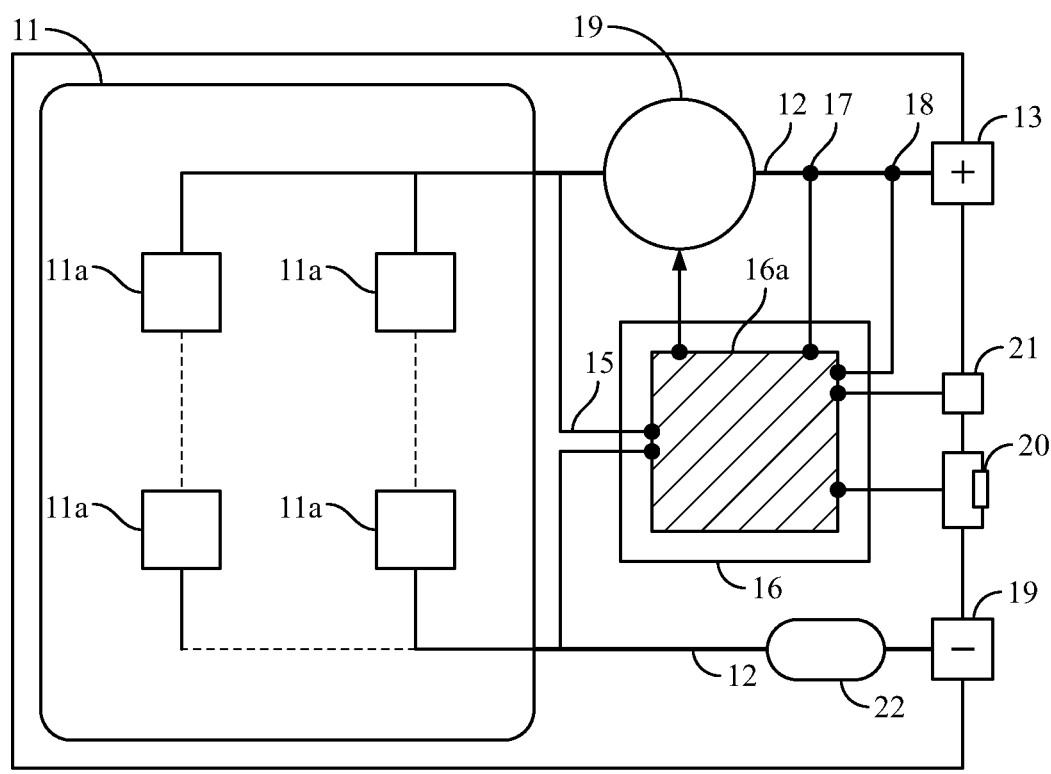
FIG. 1 is a block diagram of a battery system in accordance with the present invention.
Figure 2:
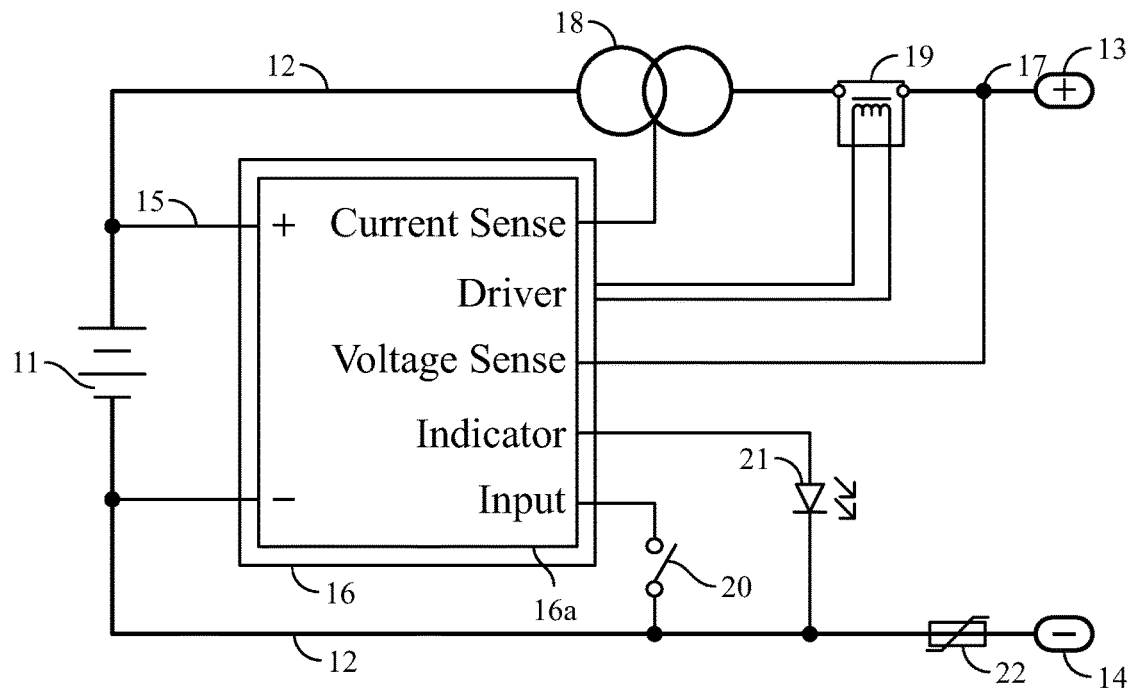
FIG. 2 is a schematic diagram of the battery system of FIG. 1.
Figure 3:
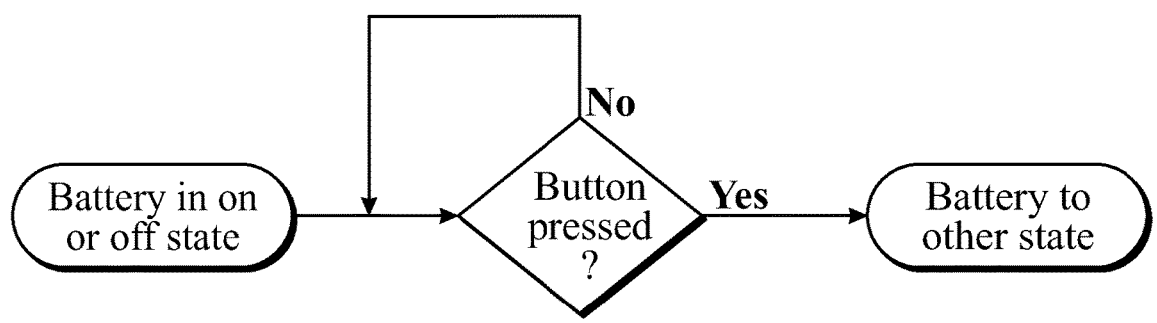
FIG. 3 is a flowchart illustrating a conventional method of turning on, and off, a battery.

A battery system, generally designated 8, in accordance with the present invention, is illustrated in FIGS. 1 and 2.

The battery system 8 may include a battery pack 11. The battery pack 11 may include one or more battery cells, such as conventional lithium-ion battery cells 11a. The lithium-ion battery cells 11a may have a nominal output voltage of 3.2 volts. As is well known, the battery cells 11a may be interconnected serially and/or in parallel such that the battery pack 11 may provide output power at a desired output voltage and capacity via wires or bus bars 12 to a conventional positive terminal 13 and a negative terminal 14. The battery pack 11 may be an Extreme Angler Marine battery, having a nominal output voltage of 12.8 volts, provided by K2 Energy Solutions, Inc., Henderson NV, assignee of the present application.

The battery system 8 may also include a battery management system including a control board 16. The battery pack 11 may provide power through connections 15 to the control board 16. The control board 16 may include a conventional, programmed central processing unit (CPU) 16a, such as a conventional microprocessor and associated memory. The microprocessor may be an STM32L051 microcontroller, provided by STMicroelectronics, Geneva, Switzerland.

The control board 16 may be coupled to a conventional voltage sensor 17. The voltage sensor 17 may be a conventional switched voltage divider circuit. The control board 16 may be coupled to the voltage sensor 17, either directly or through other components, as is well known. The voltage sensor 17 may measure the voltage level between the positive terminal 13 and the negative terminal 14.

The control board 16 may be coupled to a conventional current sensor 18. The current sensor 18 may sense the current exiting the battery pack 11, such as during battery discharge, and entering the battery pack 11, such as when the battery is charging, permitting the CPU 16a to determine the state of charge of the battery pack 11.

The control board 16 may also be coupled to a contactor 19. The contactor 19 may cut off one or both of the terminals 13, 14, of the battery pack 11, upon command of the CPU 16a, thereby removing the battery pack 11 from any associated external load.

The CPU 16a may also be coupled to a user input device, such as a control switch, which may be user operable, such as a normally-open pushbutton 20. The pushbutton 20 may provide a signal to the CPU 16a to alternately activate and deactivate the battery's 'shipping mode,' discussed below, causing the CPU 16a to alternately open and close, respectively, the contactor 19.

The battery system 8 may also include an indicator light 21. The indicator light 21 may be a multi-color LED, which may display multiple colors of light upon control of the CPU 16a. In the present embodiment, the indicator light 21 may be a conventional tri-color LED, which may illuminate as green, red, or yellow (if both green and red are illuminated).

The battery system 8 may further include a conventional fuse 22, which may be used as a backup safety device.

In accordance with the present invention, the battery system 8 may require two (first and second), timed input commands, such as from a user, to alternate the state of the battery between its 'on' state and its 'off,' or 'shipping mode' state. In order to change the state of the battery, the second input command must be provided within a window of time spaced from, and following, the first input command. The first input command may be actuation (I.e., closing) of the pushbutton 20, and the second input command may be a subsequent release of the pushbutton 20.

The first input command may be provided, such as by pressing the pushbutton 20, which may initiate a first time window, the first time window continuing for a first period of time. Upon completion of the first time window, a second time window may begin, continuing for a second period of time. The battery may only change states if the second input command, which may be a release of the pushbutton 20, is provided during the second time window.

The indicator light 21 may be utilized to visually inform the user of the particular time window, such as to inform the user when to release the pushbutton 20. It is contemplated other indicators could be similarly provided, such as an audible indicator.

Initially the indicator light 21 may be off. To alternate the state of the battery, between the 'on' state and the 'shipping mode,' a user may provide the first input by depressing the pushbutton 20, which may cause the CPU 16a to illuminate the indicator light 20, such as in a first color, and to initiate a the first period of time defining the first time window. The first period of time may be five seconds in duration. The CPU 16a may continue to keep the indicator light 21 illuminated during the first period of time, provided the pushbutton 20 remains actuated.

Upon completion of the first period of time, provided the pushbutton 20 has remained depressed, the CPU 16a may illuminate the indicator light 21 in a second, different manner, such as in a second color, and initiate the second period of time defining the second time window. The second period of time may also be five seconds in duration. The indicator light 21 remains illuminated during the second period of time, provided the pushbutton 20 remains actuated.

In accordance with the invention, the CPU 16a only alternates the state of the battery if the pushbutton 20 is released during the second time window. If the pushbutton 20 is released during the first time window, or if the pushbutton 20 is released upon completion of the second time window, the CPU 16a assumes the actuation of the pushbutton 20 was unintentional. Accordingly the CPU 16a may turn off the indicator light 21, and the battery may remain in its initial state.

The indicator light 21 may also be utilized to indicate the state of charge of the battery pack 11. As discussed above, the indicator light 21 may be a conventional tri-color LED that may illuminate green (if green is alone illuminated), red (if red is alone illuminated), or substantially yellow (if both red and green are illuminated).

If the battery is in the 'on' state, and the user presses the pushbutton 20, the CPU 16a, which may monitor the state of charge of the battery pack 11 in a conventional manner, may illuminate the indicator light 21 (also indicating the first time window) as follows:

Solid Green—90%-100% battery charge;
Flashing Green—50%-90% battery charge;
Solid Yellow—35%-50% battery charge;
Flashing Yellow—20%-35% battery charge;
Solid Red—10%-20% battery charge; and
Flashing Red—0%-10% battery charge.

If the user continues to depress the pushbutton 20 for five seconds, completing the first time window, the CPU 16a initiates the second time window and switches the indicator light 21 to an alternating red/green flash for five seconds. The alternating red/green flashing indicates the second time window. As discussed above, if the user releases the pushbutton 20 during the second time window, the CPU 16a may switch the battery system 8 to the shipping mode. If the user does not release the pushbutton 20 during the second time window, the CPU 16a may turn off indicator light 21, and the battery pack 11 will remain on.

If the battery is off and the user actuates the pushbutton 20, the CPU 16a may initiate the first time window and may cause the indicator light 21 to alternate between red and green for the duration of the first time window. If the user continues to actuate the pushbutton 20 for the duration of the first time window, the CPU 16a may initiate the second time window and may cause the indicator light 21 to indicate the state of charge of the battery (as described above) for the duration of the second time window. If the user releases the pushbutton 20 during the second time window, the CPU 16a may cause the battery to turn on. If the user does not release the pushbutton 20 during the second time window, the CPU 16a may turn of the indicator light 21 and may cause the battery to remain off.

It is also to be understood that multiple input switches could be utilized, such as one as in input to the CPU 16a to initiate the first time window, and the other as an input to the CPU 16a during the second time window.

It is further to be understood that the CPU 16a may respond to an application of charging current and/or voltage to turn the battery on from a shipping mode condition.

As discussed above, after the user first actuates the pushbutton 20, the user may then watch the indicator light 21, until the indicator light 21 changes color to indicate that the battery is ready to be shut down. Then the user may release the pushbutton 20. This method may prevent the battery from being put into the shipping mode, or being brought out of the shipping mode, accidentally, such as by something resting on the pushbutton 20. If the pushbutton 20 remains actuated for too long, the battery may be prevented from going into the shipping mode. Similarly, in order to come out of the shipping mode, the user may press the pushbutton 20 until the indicator light changes to indicate the battery is ready to turn on, and then the user may release the button. This prevents the battery from turning on if something were to rest on the button during shipping. The indicator light 21 may be an optional convenience to show when the button can be released.

Figure 4:
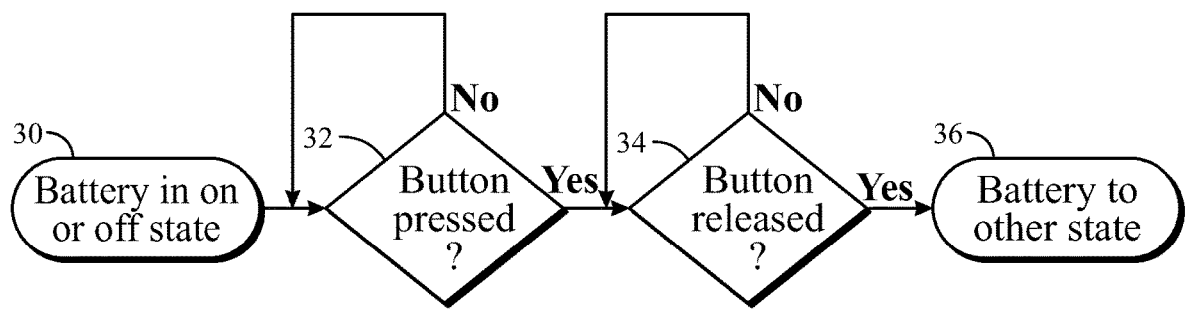
Figure 5:
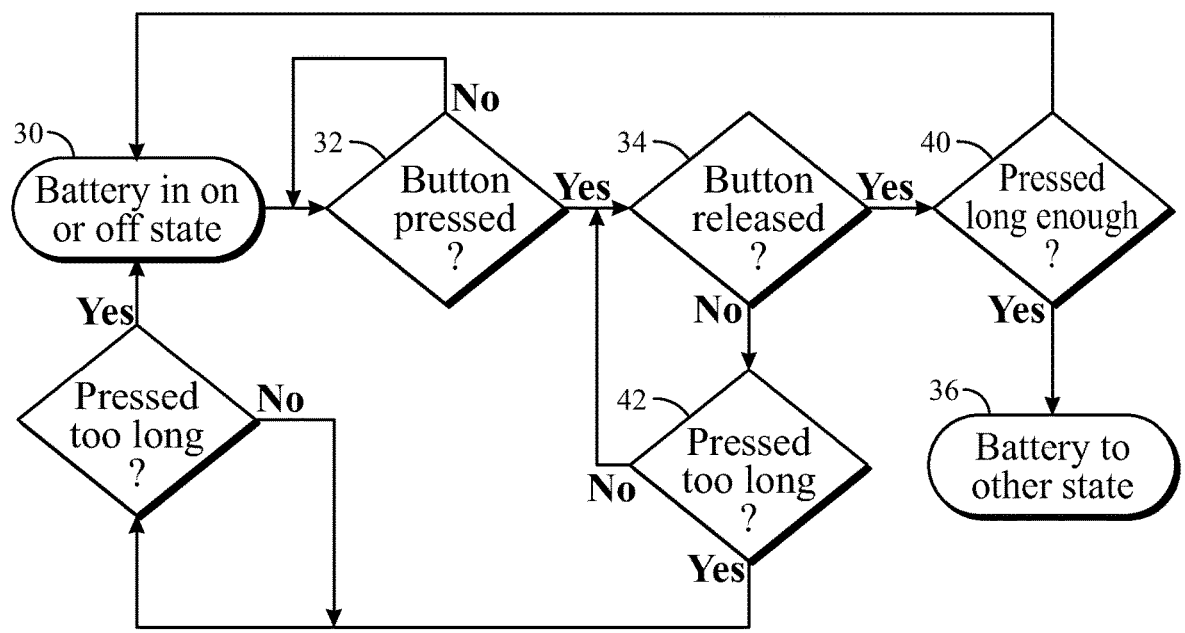

Various methods in accordance with the invention are illustrated in FIGS. 4-6.

As illustrated in FIG. 4, in a first step 30, the battery system 8 may be either in an on or an off state. In a next step 32, the CPU 16a may determine whether the pushbutton 20 is depressed. If the CPU 16a has determined the pushbutton 20 has been depressed, in a next step 34, the CPU 16a may determine whether the pushbutton 20 has been released within a period of time following detection the pushbutton 20 was depressed. If the CPU 16a determines the pushbutton 20 has been released within the period of time following detection the pushbutton 20 was depressed, the CPU 16a may change the state of the battery (step 36). This is illustrated in greater detail in FIG. 5.

FIG. 5 illustrates decision steps 40, 42, which may be performed by the CPU 16a, of determining whether the pushbutton 20 was released during the second time period by determining whether the control switch was released after initiation of the second time period (step 40), but not after the second time period (step 42). This may ensure turning the battery on or off does not accidentally occur due to accidental momentary, or prolonged, actuation of the pushbutton 20. If the CPU 16a determines the pushbutton 20 has been released within the period of time following detection the pushbutton 20 was depressed, the CPU 16a may change the state of the battery (step 36).

FIG. 6 illustrates changes in the visual output of the indicator light 20 in accordance with the invention.

In a step 50, in response to detection of actuation of the pushbutton 20 (step 32), the CPU 16a may illuminate the indicator light 21 in a manner to indicate the first time window. The CPU 16a may continue to monitor the state of the pushbutton 20, to determine whether the pushbutton 20 has been released (step 34). As long as the CPU 16a determines the pushbutton 20 has not been released (i.e., it is still being pressed), the CPU 16a may determine (step 42) whether the pushbutton 20 has been pressed too long, (i.e., beyond completion of the second time window). If the CPU 16a determines the pushbutton 20 has been pressed too long, the CPU 16a may change the illumination of the indicator light 21, such as by turning it off (step 52), and the CPU 16a does not change the state of the battery. The CPU 16a may then continue to monitor the status of the pushbutton (step 54), beginning the process again (step 30) once the pushbutton is finally released. In the event something is inadvertently activating the pushbutton 20, step 54 will reset the process once the inadvertent actuation is corrected.

In a step 52, the CPU 16a illuminates the indicator light 21 in a manner to indicate the second time window, upon determining the pushbutton has been pressed (step 34) long enough (step 40), but not too long (step 42).

Returning to step 34, if the CPU determines the pushbutton 20 has been released, the CPU 16a may then determine whether the pushbutton 20 has been pressed long enough (step 40, i.e., has the second time window begun). It should be noted that the CPU 16a has already determined the pushbutton 20 has not been pressed too long (in step 42, i.e., the second time window has not expired). If the CPU 16a determines the pushbutton 20 has not been pressed long enough (i.e., the second time window has not yet begun), the indicator light 21 may be turned off (step 52), and the CPU 16a does not change the state of the battery.

If the CPU 16a determines the pushbutton 20 has been pressed long enough (step 40; i.e., the second time window has begun), the CPU 16a changes the illumination of the indicator light 21 (step 56), to indicate the changed state of the battery (step 36).

It is contemplated that the time windows may be indicated, and distinguished from one another, in other manners. For example, the indicator light 21 may flash at different rates, with a particular rate indicating a particular one of the time windows. Additionally, the audible alarm may alarm at different frequencies, or volume levels, with a particular frequency, or volume level, indicating a particular one of the time windows. Still further, the particular time windows may be indicated, and distinguished from one another, by a tactile transducer, producing differing tactile sensations, such as amplitude or frequency, indicating a particular one of the time windows.

It is to be understood that this disclosure is not intended to limit the invention to any particular form described, but to the contrary, the invention is intended to include all modifications, alternatives and equivalents falling within the spirit and scope of the invention as defined by the appended claims.

We claim:

1. For a battery system including a battery pack and a battery management system, the battery system having battery output terminals, a circuit for alternating the state of the battery system between a connected state, wherein the battery pack is connected to the battery output terminals, and a disconnected state, wherein the battery pack is disconnected from the battery output terminals, the circuit comprising:

a central processing unit;

means electrically disposed between the battery pack and the battery terminals for alternately switching the electrical connection between the battery pack and the battery terminals, between an open electrical connection and a closed electrical connection, under control of the central processing unit; and a user input device coupled to an input to the central processing unit for producing a user input command;

wherein in response to an actuation of the user input device producing the user input command to the central processing unit, providing an indication in a first manner and initiating a first period of time defining a first time window, the indication in the first manner continuing during the first time window while the user input device remains actuated;

wherein when the user input device has remained actuated upon completion of the first period of time, providing an indication in a second, different manner and initiating a second period of time defining a second time window, the indication in the second manner continuing in the second manner during the second time window while the user input device remains actuated; and wherein the central processing unit only operates the switching means to alternate the state of the battery system if the user input command is released during the second time window, wherein if the user input command is released during the first time window or upon completion of the second time window, the indication is provided in a third manner different than the second manner and the battery system remains in its initial state.

2. The circuit of claim 1, wherein the indication is provided as an audible indicator.

3. The circuit of claim 2, wherein each of the time windows is indicated as a unique audible frequency.

4. The circuit of claim 2, wherein each of the time windows is indicated as a unique audible volume level.

5. The circuit of claim 1, wherein the indication is provided as a tactile indicator.

6. The circuit of claim 5, wherein each of the time windows is indicated as a unique tactile frequency.

7. The circuit of claim 5, wherein each of the time windows is indicated as a unique tactile amplitude level.

8. The circuit of claim 1, wherein the indication is provided as a visual indicator.

9. The circuit of claim 8, wherein each of the time windows is indicated as a unique color.

10. The circuit of claim 8, wherein each of the time windows is indicated as a unique brightness level.

11. The circuit of claim 8, wherein the visual indicator comprises a multi-color LED.

12. The circuit of claim 11, wherein:

illuminating the indicator light in the first manner comprises illuminating the multi-color LED in a first color; and illuminating the indicator light in the second manner comprises illuminating the multi-color LED in a second, different color.

13. The circuit of claim 1, wherein the user input device comprises a pushbutton switch.

14. The circuit of claim 1, wherein the pushbutton switch comprises a normally-open pushbutton switch.

15. The circuit of claim 1, wherein the switching means comprises an electrically operated switch.

16. The circuit of claim 15, wherein the electrically operated switch comprises a contactor.

\* \* \* \* \*